United States Patent
Koba et al.

(10) Patent No.: US 7,338,174 B2
(45) Date of Patent: Mar. 4, 2008

(54) SHUTTER DEVICE AND PROJECTION TYPE VIDEO DISPLAY

(75) Inventors: Hiroki Koba, Osaka (JP); Kaoru Hoshide, Tokyo (JP); Minoru Kouchi, Tokyo (JP)

(73) Assignees: Sanyo Electric Co., Ltd., Moriguchi-shi (JP); THK Co., Ltd., Tokyo (JP)

( * ) Notice: Subject to any disclaimer, the term of this patent is extended or adjusted under 35 U.S.C. 154(b) by 298 days.

(21) Appl. No.: 11/059,699

(22) Filed: Feb. 17, 2005

(65) Prior Publication Data

US 2005/0185151 A1  Aug. 25, 2005

(30) Foreign Application Priority Data

Feb. 23, 2004  (JP) .............................. 2004-046989

(51) Int. Cl.
*G03B 21/14* (2006.01)
*H04N 9/31* (2006.01)
*G02B 26/02* (2006.01)
*F21V 3/08* (2006.01)
*E06B 9/30* (2006.01)

(52) U.S. Cl. .......................... 353/88; 353/97; 353/102; 359/227; 359/236; 359/739; 359/741; 359/578; 362/321; 160/168.1 R; 348/362; 348/363; 348/744; 396/458; 396/510

(58) Field of Classification Search .................. 353/88, 353/91, 93, 97, 102; 359/738, 739, 578, 359/741, 227, 232–236; 362/321, 324; 349/7; 160/168.1 R See application file for complete search history.

(56) References Cited

U.S. PATENT DOCUMENTS

| | | | | |
|---|---|---|---|---|
| 6,559,901 | B2 * | 5/2003 | Yamamoto et al. | 349/5 |
| 7,055,965 | B2 * | 6/2006 | Koba | 353/88 |
| 7,168,475 | B2 * | 1/2007 | Colson et al. | 160/168.1 R |
| 2003/0086265 | A1 * | 5/2003 | Iisaka et al. | 362/268 |
| 2005/0001938 | A1 * | 1/2005 | Koba | 348/744 |

(Continued)

FOREIGN PATENT DOCUMENTS

CN  1723415 A  1/2006

(Continued)

OTHER PUBLICATIONS

European Search Report dated Oct. 13, 2006, issued in corresponding European Patent Application No. 05 25 0989.

*Primary Examiner*—Melissa Jan Koval
(74) *Attorney, Agent, or Firm*—Westerman, Hattori, Daniels & Adrian, LLP.

(57) ABSTRACT

Each shading plate comprises a rotating shaft and a driving shaft arranged vertically. First divided shading plate is loosely fitted to and supported by (not adhere to) the rotating shaft and rotates around the shaft. Second divided shading plates are fixed to the rotating shafts and rotate by rotating movement of the shafts. A driving shaft is connected longitudinally to (not adhere to) an edge of the first divided shading plate and supply power to rotate the first divided shading plates. Recesses are formed at the center of upper short side and at the center of lower short side of the first divided shading plate and the first divided shading plate and the second divided shading plates which form one and the same shading plate are so constructed that their short sides are overlapped each other.

11 Claims, 5 Drawing Sheets

U.S. PATENT DOCUMENTS

2006/0050248 A1  3/2006  Koga et al.
2006/0103815 A1* 5/2006  Peterson .................. 353/88

FOREIGN PATENT DOCUMENTS

| EP | 1 569 032 A1 | 8/2005 |
| EP | 1569468 A2 * | 8/2005 |
| JP | 2002-365607 | 12/2002 |
| WO | WO 2005/026835 A1 | 3/2005 |

* cited by examiner

SHUTTER DEVICE AND PROJECTION TYPE VIDEO DISPLAY

BACKGROUND OF THE INVENTION

Field of the Invention

The present invention relates to a shutter device and a projection type video display with the shutter device.

One of the ways of utilizing a liquid crystal projector is to receive a video signal outputted from a personal computer to project an image. That is, when a person who makes a presentation operates a personal computer to display an image which he or she wants participants of the presentation to see on a display of the personal computer, the same image is enlarged and projected on a screen by a liquid crystal projector, so that all the participants of the presentation can see the image. On the other hand, in some cases, the person who makes a presentation may not desire an image which appears in the course of operating the computer to be viewed by the participants. In order to cope with such cases, there has been proposed a liquid crystal projector equipped with a projection shutdown mechanism for temporarily intercepting the projection of an image. A conventional projection shutdown mechanism, for example, has a configuration in which a shading plate is placed on an optical path so that light passed through a liquid crystal display panel is shut off at a stage before the light enters a projection lens. Furthermore, there is a liquid crystal projector equipped with a shutter arranged on light exit side of a light source for contrast enhancement (see JP-A-2002-365607).

SUMMARY OF THE INVENTION

However, in a conventional mechanism in which light is shut off at a stage before the light enters a projection lens, illuminating light enters a liquid crystal display panel even while image projection is being shut off. The temperature of a liquid crystal display panel is increased due to incidence of light, and excessive increase in temperature decreases reliability of liquid crystal layer, polarizing plate, or the like. Therefore, it is desirable that light incidence into the liquid crystal display panel is interrupted when image projection is stopped. It is also desirable to have a mechanism in which the amount of light can be controlled easily at a plurality of stages. For example, two modes, a screen projection mode for a personal computer and a moving image (like a movie) projection mode, are installed and the amount of light incident on the liquid crystal display panel is set to variable in these two modes.

In view of the foregoing circumstances, it is an object of the present invention to provide a shutter device and a projection type video display which are capable of blocking incidence of light on a liquid crystal display panel or the like when image projection is stopped temporarily and controlling the amount of light at a plurality of stages.

In order to solve the above-mentioned problem, a shutter device according to the present invention is provided with a plurality of rectangular-shaped shading plates which form a shading state and a non-shading state by their rotating movement, and each shading plate is composed of a plurality of divided shading plates so that a partial shading state can be formed, and the shading plate is so provided as to be rotated by a rotating shaft located longitudinally at the center thereof, and a recess is formed on a short side of at least one of the divided shading plates which form one and the same shading plate so that the short sides of respective divided shading plates can be overlapped each other.

In the above-mentioned configuration, the divided shading plates can rotate independently while keeping short sides of respective divided shading plates overlapped each other.

Also, a shutter device according to the present invention is provided with a plurality of rectangular-shaped shading plates which form a shading state and a non-shading state by their rotating movement, and each shading plate is composed of a plurality of divided shading plates so that a partial shading state can be formed, and the shading plate is so provided as to be rotated by a rotating shaft located longitudinally at the center thereof. Moreover, the divided shading plates which form one and the same shading plate are provided such that short sides of respective divided shading plates are overlapped each other, and the short side of at least one of the divided shading plates is formed to be thin-wall.

In the above-mentioned configuration, the short sides of the divided shading plates overlapping each other are formed to be thin-wall, so that openings are unlikely to be created in the overlapping area.

In a shutter device of these configurations, it is desirable that the shading plate is formed by putting two approximately T-shaped plates together in opposite direction so as to form at least one of the aforementioned recess and the aforementioned thin-wall area. According to this, at least one of the recess and the thin-wall can be easily obtained.

Moreover, a shutter device according to the present invention is provided with a plurality of rectangular-shaped shading plates which form a shading state and a non-shading state by their rotating movement, and each shading plate is composed of a plurality of divided shading plates so that a partial shading state can be formed, and a part of divided shading plates which form one and the same shading plate are fixed to a rotating shaft provided longitudinally at the center or on the side of aforementioned a part of divided shading plates to be driven to rotate, while the other part of divided shading plates which form one and the same shading plate are loosely fitted to the rotating shaft to be driven to rotate by a driving shaft arranged separately from the rotating shaft.

It may be possible that divided shading plates are rotated independently by arranging two rotating shafts closely each other, but this will make a structure complicated. On the other hand, it is possible to avoid complicated structure, if divided shading plates are loosely fitted to the rotating shaft and rotated by a driving shaft provided separately from the rotating shaft.

In the configuration in which the driving shaft is provided, it is preferable that a concave area is formed on a certain area of aforementioned a part of divided shading plates where the driving shaft contacts. This will prevent a range of rotation of the other part of divided shading plates from being narrowed down even if the driving shaft contacts the aforementioned a part of divided shading plates. Also in the above-mentioned configuration in which the driving shaft is provided, a slidably moving driving plate may be provided, and an eccentric portion located on an edge of the driving shaft is linked with a joint portion of the driving plate, and the driving plate is driven by an actuator.

Moreover, in the above-mentioned configuration, a slidably moving driving plate may be provided, and an eccentric portion located on an edge of the rotating shaft is linked with a joint portion of the driving plate, and the driving plate is driven by an actuator.

Also, a shutter device according to the present invention is provided with a plurality of rectangular-shaped shading plates which form a shading state and a non-shading state by their rotating movement and a supporting member composed of a first member and a second member, and recesses are formed on at least one of the two members which form the supporting member, and rotating shafts for rotating the shading plates are supported by hole-shaped portions which are made by the recesses obtained by arranging the first member and the second member in parallel. In such a configuration, hole-shaped portions for rotating shafts can be easily formed, compared with the case where the hole-shaped portions are formed by using a drill, etc. Moreover, hole-shaped portions can be formed at the same intervals with the arranging pitch of the rotating shafts without requiring high processing accuracy.

A projection type video display which modulates light emitted from a light source to project a video according to the present invention is characterized by comprising the shutter device according to any one of configurations mentioned above and an integrator lens composed of a pair of fly's eye lenses provided on light exit side of the light source, and is further characterized in that the aforementioned shutter device is provided such that the shading plates are in a position deflected from respective effective light paths between the pair of fly's eye lenses.

In the above-mentioned configuration, illuminating light is shielded between a pair of fly's eye lenses, so that light incidence into a light valve is blocked when image projection is temporarily stopped, and also it is possible to control light amount at a plurality of stages according to the number of lenses of the fly's eye lens.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A liquid crystal projector and a shutter device according to an embodiment of the present invention are now described referring to FIGS. 1 to 5.

Figure 1:
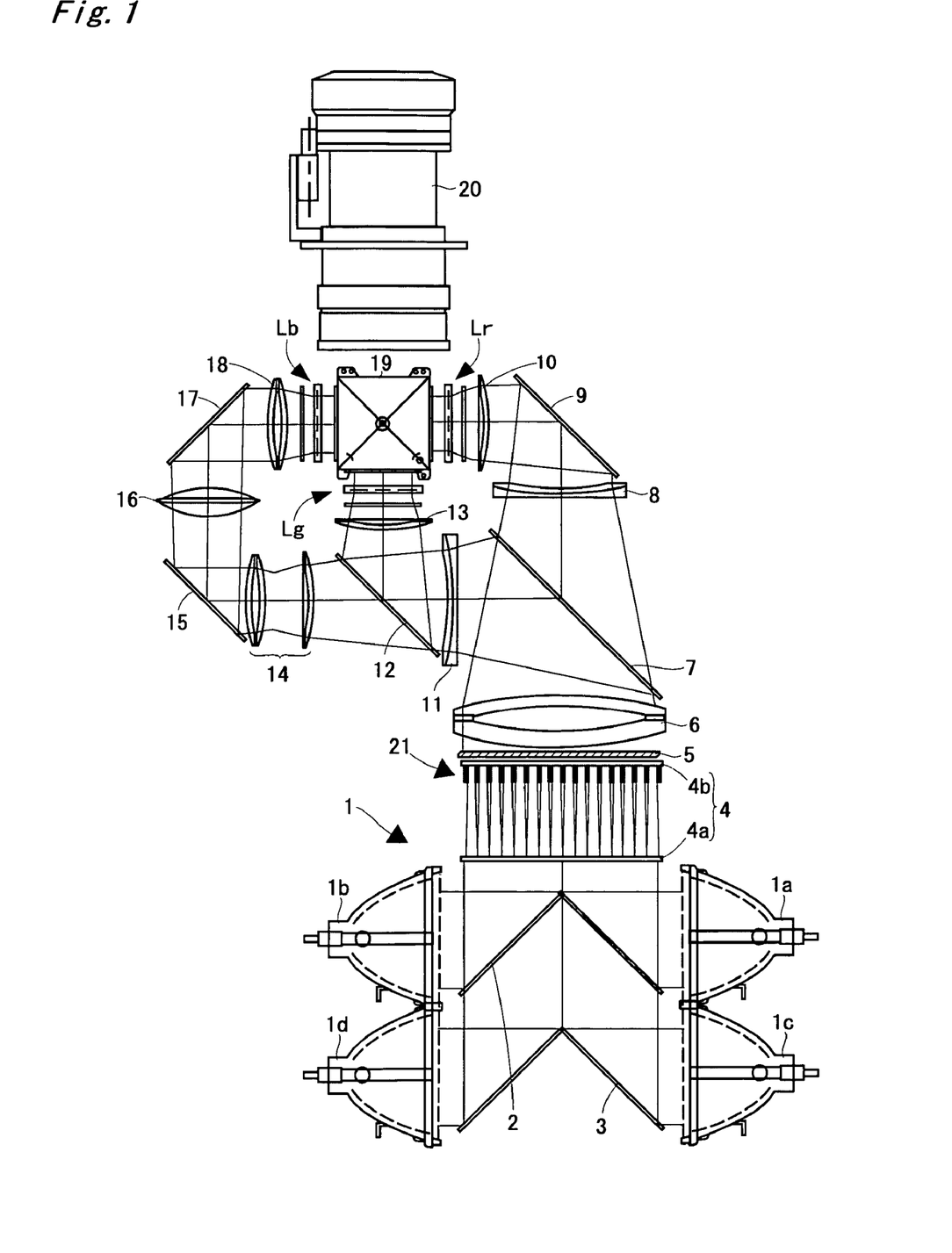
FIG. 1 is a constructional view showing a liquid crystal projector according to an embodiment of the present invention.

FIG. 1 is a diagram showing a four-lamp and three-panel liquid crystal projector according to an embodiment of the present invention. An illuminating device 1 comprises four light sources 1a, 1b, 1c, and 1d, a mirror 2 arranged between the light sources 1a and 1b, and a mirror 3 arranged between the light sources 1c and 1d. Each light source is composed of an ultra-high pressure mercury lamp, a metal halide lamp, a xenon lamp, or the like, and its irradiated light is emitted after being changed into parallel light by a parabolic reflector, to be guided into an integrator lens 4.

The integrator lens 4 comprises a pair of fly's eye lenses 4a and 4b. Each pair of lenses guides light emitted from the illuminating device 1 into the whole surface of a liquid crystal panel, described later, to even off local luminance non-uniformity existing in the illuminating device 1, thereby decreasing the difference between the light amount at the screen center and the light amount at the screen perimeter. The light which has passed through the integrator lens 4 is guided into a first dichroic mirror 7 after passing through a polarization conversion system 5 and a condenser lens 6.

The polarization conversion system 5 is composed of a polarizing beam splitter array (hereinafter referred to as a PBS array). The respective PBS arrays comprise polarized light separating surfaces 5a and retardation plates (½ λ plates) 5b. The respective polarized light separating surfaces 5a of the PBS array transmit, for example, the P polarization of the light from the integrator lens 4 and change the light path of the S polarization of the light from the integrator lens 4 by 90 degree. The S polarization having a changed light path is reflected by an adjacent polarized light separating surface 5a and is emitted as it is. On the other hand, the P polarization of the light from the integrator lens 4 which passed through the polarized light separating surface 5a is converted into the S polarization by the aforementioned retardation plate 5b provided in the front side (the light emitting side) thereof and is emitted. Namely, in this case, almost all the light is converted into the S polarization.

The first dichroic mirror 7 transmits light in a red wavelength band and reflects light in a cyan (green+blue) wavelength band. The light in the red wavelength band which has passed through the first dichroic mirror 7 is reflected from a reflecting mirror 9 through a concave lens 8 so that its optical path is changed. The red light reflected by the reflecting mirror 9 passes through a lens 10 and is guided to a transmission type liquid crystal panel for red light Lr to be optically modulated by passing therethrough. On the other hand, the light in the cyan wavelength band which has been reflected by the first dichroic mirror 7 is guided into a second dichroic mirror 12 through a concave lens 11.

The second dichroic mirror 12 transmits light in a blue wavelength band and reflects light in a green wavelength band. The light in the green wavelength band reflected by the second dichroic mirror 12 passes through a lens 13 and is guided to a transmission type liquid crystal panel for green light Lg to be optically modulated by passing therethrough. The light in the blue wavelength band which has passed through the second dichroic mirror 12 passes through a relay lens 14, a reflecting mirror 15, a relay lens 16, a reflecting mirror 17, and a relay lens 18 and is guided to a transmission type liquid crystal panel for blue light Lb to be optically modulated by passing therethrough.

The respective liquid crystal panels Lr, Lg, and Lb comprise incidence side light polarizing plates, panels constructed by sealing a liquid crystal between a pair of glass plates (having a pixel electrode and an alignment film formed therein), and exit side light polarizing plates.

The modulated light (image light in respective colors) obtained by passing respectively through the liquid crystal panels Lr, Lg, and Lb is combined by a cross dichroic prism 19 to be full color image light. This full color image light is enlarged by a projection lens 20 and projected on a screen which is not shown.

Figure 2:
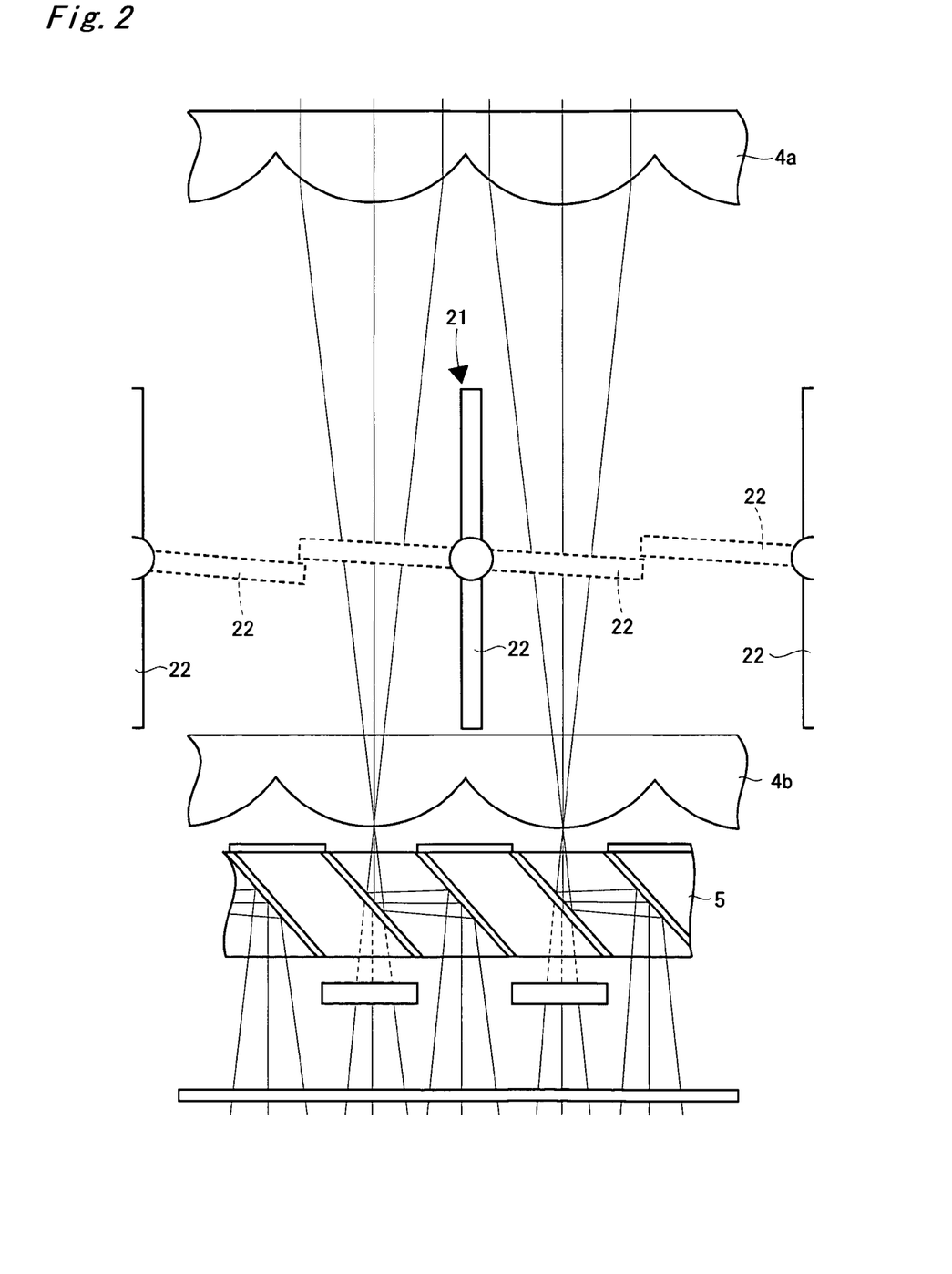
FIG. 2 is an enlarged view of a portion where a shutter device is arranged.
Figure 3A:
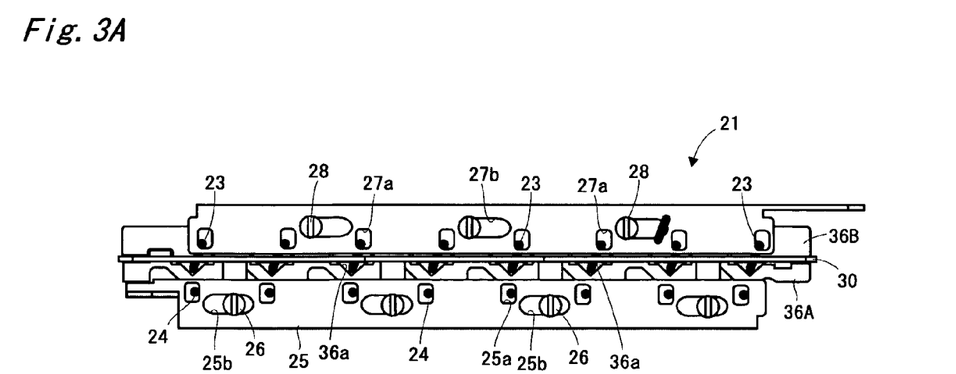
FIG. 3A is an enlarged plan view of a shutter device according to an embodiment of the present invention.
Figure 3B:
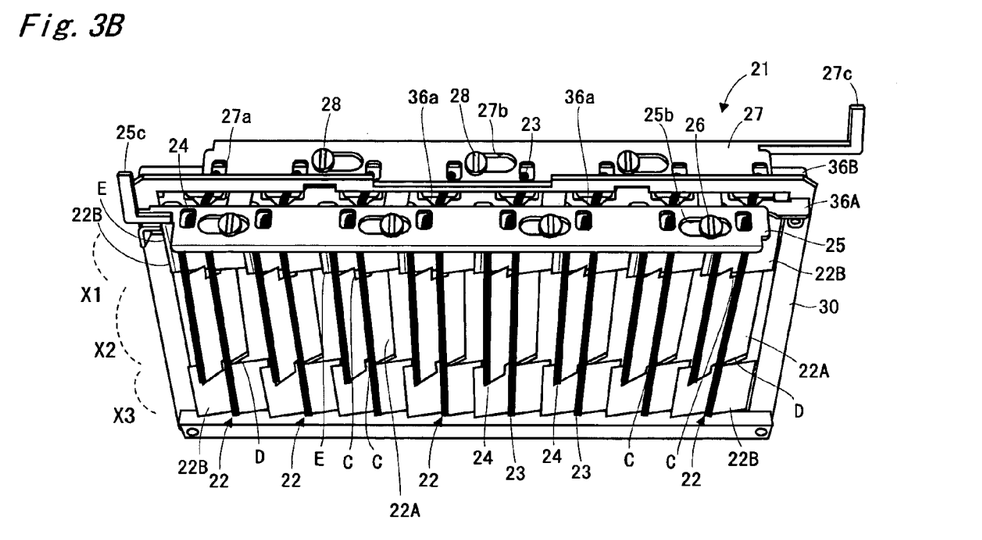
FIG. 3B is an enlarged perspective view showing a shutter device according to an embodiment of the present invention.

A shutter device 21 comprises a plurality of black rectangular-shaped shading plates 22, as shown in FIGS. 2, 3A, and 3B. The respective shading plates 22 are provided at a position in the vicinity of fly's eye lens 4b arranged on the side of polarization conversion system 5 where passage of effective illuminating light is not blocked. Each shading plate 22 is divided into a first divided shading plate 22A which shields light at the center area of the fly's eye lens 4b and second divided shading plates 22B which shield light at the upper and lower areas of fly's eye lens 4b. More particularly, the first divided shading plate 22A is so constructed as to block the center one-third area (area X2 shown in FIG. 3B) of the fly's eye lens 4b, and the second divided shading plates 22B are so constructed as to block the upper one-third area (area X2 shown in FIG. 3B) and the lower one-third area (area X3 shown in FIG. 3B) of the fly's eye lens 4b.

Each shading plate 22 comprises a rotating shaft 23 and a driving shaft 24 arranged vertically. The rotating shaft 23 is positioned longitudinally at the center of the first divided shading plate 22A and the second divided shading plates 22B. Each of the first divided shading plates 22A is loosely fitted to and supported by (not adhere to) the rotating shaft 23 and rotates around the shaft. Each of the second divided shading plates 22B is fixed to the rotating shaft 23 and rotated by rotating movement of the shaft 23. The driving shaft 24 is connected longitudinally to (not adhere to) an edge of the first divided shading plate 22A and supplies power to rotate the first divided shading plate 22A. Thus, it is possible that the first divided shading plate 22A and the second divided shading plates 22B rotate independently. Accordingly, a partial shading state can be formed. The adjoining shading plates 22 are so constructed that their longitudinal edges are overlapped each other when the shading plates 22 shield light.

The first divided shading plate 22A and the second divided shading plates 22B which form one and the same shading plate 22 are so constructed that their short sides are overlapped each other. More particularly, as shown in FIG. 3B, the upper left-hand short side and the lower left-hand short side of the first divided shading plate 22A are positioned on the front of the second divided shading plates 22B so as to overlap respectively onto the lower short side of the upper second divided shading plate 22B and onto the upper short side of the lower second divided shading plate 22B. Also, the upper right-hand short side and the lower right-hand short side of the first divided shading plate 22A are positioned on the back of the second divided shading plates 22B so as to overlap respectively onto the lower short side of the upper second divided shading plate 22B and onto the upper short side of the lower second divided shading plate 22B. Accordingly, recesses C are formed at the center of upper short side and at the center of lower short side of the first divided shading plate 22A. The aforementioned upper short sides and the lower short sides of the first divided shading plates 22A (the areas overlapping the second divided shading plate 22B) are thin-wall areas D.

Figure 4A:
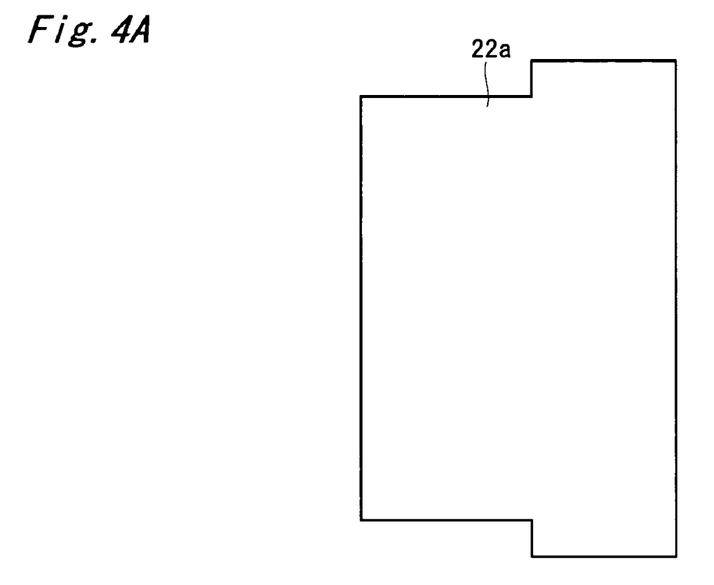
FIG. 4A is a plan view showing an approximately T-shaped plate to make a first divided shading plate.
Figure 4B:
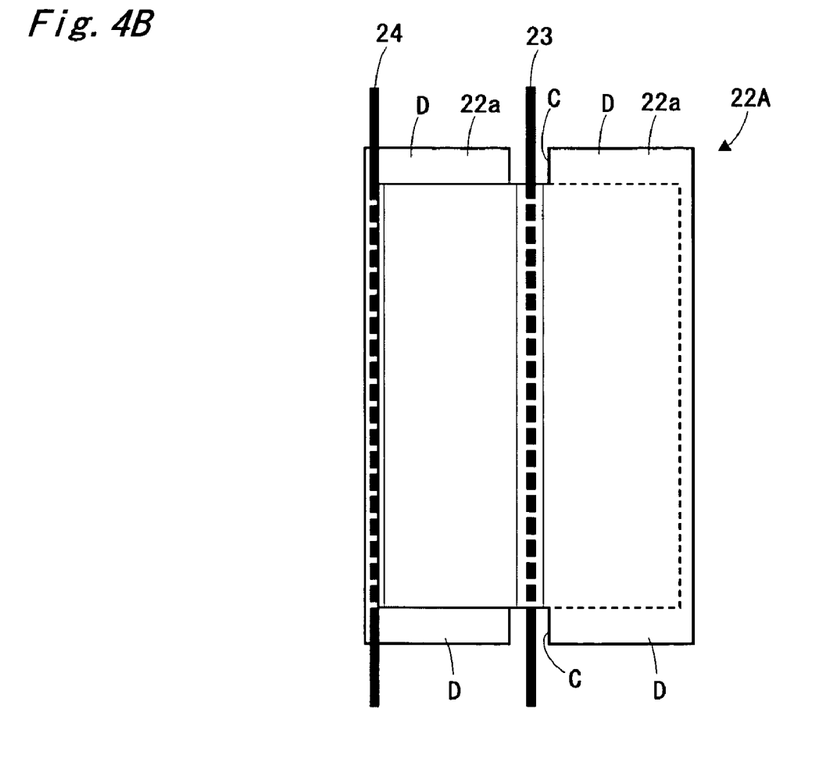
FIG. 4B is a plan view of a first divided shading plate.

In order to obtain the recesses C and the thin-wall areas D, the first divided shading plate 22A is made by using two approximately T-shaped plates 22a shown in FIG. 4A. When these two approximately T-shaped plates 22a are put together in opposite direction each other as shown in FIG. 4B, the first divided shading plate 22A can be obtained.

Then, the recesses C and thin-wall areas D can be easily formed on the first divided shading plate 22A.

Since the first divided shading plate 22A is rotated by the driving shaft 24, the driving shaft 24 contacts the longitudinal edge of the upper second divided shading plate 22B. However, it is not desirable that the contact creates a large opening between the first divided shading plate 22A and the upper second divided shading plate 22B. Accordingly, a concave (a difference in level) area E is formed on the longitudinal edge of the upper second divided shading plate 22B where the driving shaft 24 contacts.

The upper end of the driving shaft 24 is bent over (eccentric) and the point of the bent portion is linked with a joint hole 25a on a first driving plate 25. A guide slot 25b is formed on the first driving plate 25. A guide member 26 is linked with the guide slot 25b, and the head of guide member 26 restrains the vertical movement of the first driving plate 25. The first driving plate 25 is guided by the body of the guide member 26 to move horizontally (in the Fig). The guide member 26 is fixed to a projecting portion 30a formed on the frame (frame member) 30. A hook-shaped portion 25c is formed on an edge of the first driving plate 25, and an electromagnetic solenoid (actuator, not shown) is connected with the hook-shaped portion 25c. The first driving plate 25 is driven to move right or left by the electromagnetic solenoid, thereby the first divided shading plate 22A is driven.

The upper end of the rotating shaft 23 is bent over (eccentric) and the point of the bent portion is linked with a joint hole 27a on a second driving plate 27. A guide slot 27b is formed on the second driving plate 27. A guide member 28 is linked with the guide slot 27b, and the head of guide member 28 restrains the vertical movement of the second driving plate 27. The second driving plate 27 is guided by the body of the guide member 28 to move horizontally (in the Fig). The guide member 28 is fixed to a projecting portion 30a formed on the frame 30. A hook-shaped portion 27c is formed on an edge of the second driving plate 27, and an electromagnetic solenoid (actuator, not shown) is connected with the hook-shaped portion 27c. The second driving plate 27 is driven to move right or left by the electromagnetic solenoid (actuator), thereby the second divided shading plate 22B is driven.

A support block 35 is fixed to the lower end of the frame 30. On the support block 35, a plurality of recesses are formed at certain intervals which correspond to the arranging pitch of the rotating shafts 23, and the lower end of the rotating shafts 23 are supported by the recesses. A supporting plate 36 is fixed to the upper end of the frame 30. The supporting plate 36 comprises a first supporting plate 36A and a second supporting plate 36B which are arranged in parallel each other. The first supporting plate 36A and the second supporting plate 36B respectively have a plurality of recesses to be in a corrugated shape. Hole-shaped portions 36a are formed by putting the recessed areas of the first supporting plate 36A and the recessed areas of the second supporting plate 36B together. The upper end side linear portions of the rotating shafts 23 are linked with these hole-shaped portions 36a. In such a configuration in which hole-shaped portions 36a are formed in an above-mentioned way, it is easier to form hole-shaped portions, compared with a configuration in which hole-shaped portions for rotating shafts are made by using a drill. Moreover, hole-shaped portions can be formed at the same intervals with the arranging pitch of the rotating shafts without requiring high processing accuracy.

As mentioned above, the recesses C are formed at the center of the upper short side and at the center of the lower short side of the first divided shading plate 22 A. Accordingly, the first divided shading plate 22A and the second divided shading plates 22B can be rotated independently, while the upper short side of the first divided shading plate 22A and the lower short side of the upper second divided shading plates 22B can be overlapped each other, and the lower short side of the first divided shading plate 22A and the upper short side of the lower second divided shading plates 22B can be overlapped each other. Since the upper short side and lower short side of the first divided shading plate 22A are so constructed as to be thin-wall areas D, openings are unlikely to be created in the portions where the first divided shading plate 22A and the second divided shading plates 22B overlap each other. Also, the respective first divided shading plates 22A are formed by using two approximately T-shaped plates 22a. Therefore, it is easy to form the recesses C and the thin-wall areas D with a small number of members. The first divided shading plates 22A are loosely fitted to the rotating shafts 23, and are driven to rotate by the driving shafts 24 arranged separately from the rotating shafts 23, thereby avoiding complicated structure. The driving shafts 24 contact the longitudinal edges of the upper second divided shading plates 22B. However, the depression areas E are formed on the longitudinal edges of the upper second divided shading plates 22B, thereby preventing large openings from being formed.

In the above-mentioned configuration, the first divided shading plates 22A and the second divided shading plates 22B rotate around the rotating shafts 23 provided longitudinally at the center of the first and second divided shading plates. However, it does not mean that the present invention should be limited to the same, and the first and second divided shading plates may rotate around rotating shafts provided longitudinally on one side of the divided shading plates. However, the former configuration has an advantage that a smaller number of rotating shafts will be needed, since light can be shielded on both left and right sides of the shading plates.

Figure 5A:
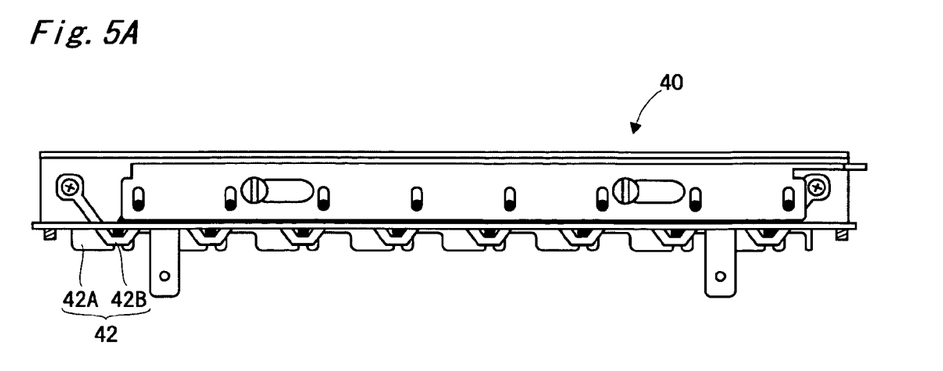
FIG. 5A is an enlarged plan view of a shutter device according to another example of an embodiment of the present invention.
Figure 5B:
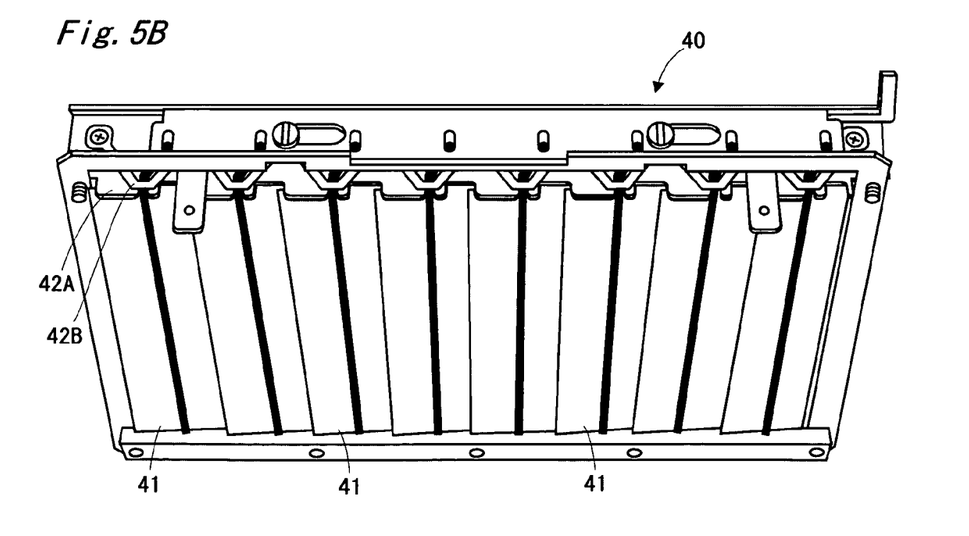
FIG. 5B is an enlarged perspective view of a shutter device according to another example of an embodiment of the present invention.

A shutter device 40 shown in FIG. 5 has undivided shading plates 41. Such shutter device 40 may also have a supporting plate 42 formed by arranging a first supporting plate 42A and a second supporting plate 42B in parallel each other. The first supporting plate 42A has a plurality of recesses. The second supporting plate 42B has a plurality of recesses to be corrugated. Hole-shaped portions are formed by putting the recessed portions of respective supporting plates 42A and 42B together. The upper end side linear portions of rotating shafts are linked with these hole-shaped portions. Also in such a configuration, it is easier to form hole-shaped portions, compared with the case where hole-shaped portions for rotating shafts are formed by using a drill. Moreover, hole-shaped portions can be formed at certain intervals corresponding to the arranging pitch of the rotating shafts without requiring high processing accuracy.

As described above, the present invention prevents light incidence to a liquid crystal panel and the like when image projection is temporarily stopped. Moreover, there is such an advantage that the light amount of illumination can be easily controlled at a plurality of stages.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A shutter device comprising a plurality of rectangular-shaped shading plates which form a shading state and a non-shading state by their rotating movement, wherein
    each shading plate is composed of a plurality of divided shading plates so that a partial shading state can be formed, and
    said each shading plate is so provided as to be rotated by a rotating shaft located longitudinally at the center thereof, and a recess is formed on a short side of at least one of the divided shading plates which form one and the same shading plate so that the short sides of respective divided shading plates can be overlapped by each other.

2. The shutter device according to claim 1, wherein said shading plate is formed by putting two approximately T-shaped plates together in opposite direction so as to form said recess.

3. The shutter device according to claim 1, wherein a slidably moving driving plate is provided;
    an eccentric portion located on an edge of said rotating shaft is linked with a joint portion of said driving plate; and
    said driving plate is driven by an actuator.

4. A shutter device comprising a plurality of rectangular-shaped shading plates which form a shading state and a non-shading state by their rotating movement, wherein
    each shading plate is composed of a plurality of divided shading plates so that a partial shading state can be formed;
    said each shading plate is so provided as to be rotated by a rotating shaft located longitudinally at the center thereof;
    said divided shading plates which form one and the same shading plate are provided so that short sides of respective divided shading plates are overlapped by each other; and
    said short side of at least one of the divided shading plates is formed to be thin-wall.

5. The shutter device according to claim 4, wherein said shading plate is formed by putting two approximately T-shaped plates together in opposite direction so as to form said thin-wall area.

6. The shutter device according to claim 4, wherein a slidably moving driving plate is provided;
    an eccentric portion located on an edge of said rotating shaft is linked with a joint portion of said driving plate; and
    said driving plate is driven by an actuator.

7. A shutter device comprising a plurality of rectangular-shaped shading plates which form a shading state and a non-shading state by their rotating movement, wherein
    said each shading plate is composed of a plurality of divided shading plates so that a partial shading state can be formed, and
    a part of divided shading plates which form one and the same shading plate are fixed to a rotating shaft provided longitudinally at the center or on the side of said a pan of divided shading plates to be driven to rotate, while the other part of divided shading plates which form one and the same shading plate are loosely fitted to said rotating shaft to be driven to rotate by a driving shaft arranged separately from said rotating shaft.

8. The shutter device according to claim 7, wherein a concave area is formed on a certain part of said a part of divided shading plates where said driving shaft contacts.

9. The shutter device according to claim 7, wherein a slidably moving driving plate is provided;
  an eccentric portion located on an edge of said driving shaft is linked with a joint portion of said driving plate; and
  said driving plate is driven by an actuator.

10. The shutter device according to claim 7, wherein a slidably moving driving plate is provided;
  an eccentric portion located on an edge of said rotating shaft is linked with a joint portion of said driving plate; and
  said driving plate is driven by an actuator.

11. In a projection type video display which modulates light emitted from a light source to project a video,
  a projection type video display comprising the shutter device according to any one of claims 1 to 10, and
  an integrator lens comprising a pair of fly's eye lenses provided on light exit side of said light source, and said shutter device is provided such that said shading plates are in a position deflected from respective effective light paths between said pair of fly's eye lenses.

* * * * *